United States Patent [19]
Grijpma et al.

[11] Patent Number: 5,672,367
[45] Date of Patent: Sep. 30, 1997

[54] BIODEGRADABLE CHEWING GUM

[75] Inventors: Dirk Wybe Grijpma, Groningen; Johannes Fredericus Laimböck, Apeldoorn; Albert Johan Pennings, Norg, all of Netherlands

[73] Assignee: Rijksuniversiteit te Groningen, Netherlands

[21] Appl. No.: 543,182

[22] Filed: Oct. 13, 1995

[30] Foreign Application Priority Data

Oct. 14, 1994 [NL] Netherlands .............. 9401703

[51] Int. Cl.$^6$ ........................... A23G 3/30
[52] U.S. Cl. ........................... 426/6; 426/3
[58] Field of Search ............... 426/3–6; 424/48

[56] References Cited

U.S. PATENT DOCUMENTS

| | | | |
|---|---|---|---|
| 4,816,265 | 3/1989 | Cherukuri et al. | 426/5 |
| 4,931,293 | 6/1990 | Cherukuri et al. | 426/5 |
| 4,933,190 | 6/1990 | Cherukuri et al. | 426/5 |
| 4,981,698 | 1/1991 | Cherukuri et al. | 426/5 |
| 5,057,328 | 10/1991 | Cherukuri et al. | 426/5 |
| 5,250,584 | 10/1993 | Ikada et al. | 523/114 |

FOREIGN PATENT DOCUMENTS

| | | |
|---|---|---|
| 0 258 780 | 8/1987 | European Pat. Off. . |
| 2 635 685 | 2/1990 | France . |
| 2 166 651 | 5/1986 | United Kingdom . |
| WO 94/17673 | 8/1994 | WIPO . |

*Primary Examiner*—Arthur L. Corbin
*Attorney, Agent, or Firm*—Michaelson & Wallace; Peter L. Michaelson; Edward M. Fink

[57] ABSTRACT

The invention relates to a biodegradable chewing gum comprising one or more conventional chewing gum components and as gum base at least one biodegradable polymer selected from the group of polyesters and polycarbonates.

11 Claims, No Drawings

BIODEGRADABLE CHEWING GUM

BACKGROUND OF THE INVENTION

The invention relates to a new chewing gum formulation which has improved properties with regard to degradability.

It is known that chewing gum can give rise to a certain extent of environmental pollution inasmuch as it is very difficult to remove, if it can be removed at all, after use. It has already been proposed to replace a number of components of the chewing gum by components that are either taken up by the user during chewing or have a less poor biodegradability than the components conventionally used. EP-A 566,174, for example, discloses the use of a conventional elastomer in combination with a wholly or partly hardened oil. It is true that in the use of this formulation the poorly degradable paraffin can be replaced by another component, but the problems involved in the use of conventional, often synthetic elastomers remain.

SUMMARY OF THE INVENTION

The present invention is based on the surprising insight that it is possible to replace the conventional, non-degradable elastomers that are used in the gum base of chewing gum by biodegradable polymers. In combination with other biodegradable additives, a chewing gum is thus obtained whose organic components are biodegradable after use.

Accordingly, the invention primarily relates to a biodegradable chewing gum comprising as gum base at least one biodegradable polymer selected from the group of polyesters and polycarbonates. More particularly, the invention relates to a biodegradable, i.e. degradable in the environment, chewing gum comprising one or more conventional chewing gum components and, included in the gum base, at least one polymer having a glass transition temperature of 37° C. at a maximum, which polymer contains chemically unstable bonds in the polymer chain.

Such chemically unstable bonds are preferably broken down under the influence of light or hydrolytically into components that are preferably water-soluble and non-toxic

DESCRIPTION OF PREFERRED EMBODIMENTS

According to a preferred embodiment of the invention, the biodegradable chewing gum comprises one or more conventional chewing gum components and as gum base at least one polyester having a glass transition temperature of 37° C. at a maximum. Such a polyester is more particularly based on the polymerisation product of one or more cyclic esters, such as lactide, glycolide, trimethylene carbonate, δ-valerolactone, β-propiolactone and ε-caprolactone. Such polyesters can for instance be used in the form of block copolymers or as mixtures of two or more homo- and/or copolymers.

It is preferred to use a gum base which is based on a copolymer or a block or graft copolymer of a lactide and one or more other cyclic esters, such as glycolide, trimethylene carbonate, δ-valerolactone, β-propiolactone and ε-caprolactone, or a mixture of two or more polymers, with at least one of the polymers containing lactide. In this preferred embodiment, it is preferred to use systems which contain at least 50% by weight of lactide units, more particularly at least 80%, based on the total of the polymers.

The preparation of such polymers for use as gum base can be effected in conventional manner, for instance by ring-opening polymerisation in the presence of suitable catalysts. These catalysts can be based on compounds of transition metals, which are preferred to have the GRAS status (generally recognised as safe).

Surprisingly, it has been found that with such biodegradable polymers a chewing gum can be obtained which has a structure and chewing characteristics comparable to those of chewing gum based on conventional, non-degradable elastomers. It has moreover been found that the adhesion of such a chewing gum to other materials, and more particularly to stone and smooth surfaces, is comparatively slight. This means that such a chewing gum can be removed from stones and the like with much less effort.

Optionally, the chewing gum according to the invention contains, in addition to the biodegradable elastomer component already described, one or more other biodegradable gum base components, together forming a water-insoluble, chewable gum base. Further, the chewing gum generally contains a water-soluble part and a water-insoluble flavour component. These last two components are generally taken up in the mouth during chewing, with the water-insoluble flavour component diffusing from the gum base along with the water-soluble component.

The suitable supplementary gum base components are, for instance, the components described in the above-mentioned European patent application 566,174, such as a fully hardened stearine fraction. The gum base can moreover contain yet other, biodegradable components, such as emulsifiers and gum base solvents. Suitable as emulsifiers are, for instance, lecithin and fatty acid monoglycerides, diglycerides and triglycerides.

The gum base may further include fillers, such as calcium carbonate, magnesium carbonate, talc, tricalcium phosphate and the like, as well as mixtures thereof. The amount of filler is generally 10 to 15% of the gum base. If desired, the gum base can also contain antioxidants, which must naturally be food-approved. Suitable antioxidants include butylhydroxide anisol and butylhydroxide toluene. Suitable amounts of antioxidant are between 0.01 and 0.1% by weight, based on the gum base.

The water-soluble component of the chewing gum, which is preferably 5 to 95% of the chewing gum and more particularly 10 to 50% by weight, comprises, for instance, plasticizer, sweeteners and combinations thereof. The plasticizers, or softeners, are added to the chewing gum in order to improve the chewability and mouthfeel of the gum. Plasticizers or softeners generally account for 0.5 to 15% by weight of the chewing gum. Examples are glycerin, lecithin and combinations thereof. The water-soluble component also contains, for instance, sorbitol, hydrogenated starch hydrolysates, cane sugar syrup and combinations thereof, as well as saccharide containing components conventionally used in chewing gum, inter alia sucrose, dextrose, maltose, dextrin, dried invert sugar, fructose, levulose, galactose, and the like, alone or in combination. Sugar-free sweeteners comprise components that contain sweetening characteristics but are free of the known sugars, and comprise, for instance, sugar alcohols, such as sorbitol, mannitol, xylitol, hydrogenated starch hydrolysates, maltitol, as well as the known sweeteners aspartame, sucrose, acesulfame and saccharide, either alone or in combination.

The chewing gum can further contain an amount of flavouring agent, which is preferably between 0.1% and 10% by weight of the chewing gum. Suitable flavouring agents are generally the known food approved flavours, such as oils of plants and fruits, such as citrus oil, fruit extracts, peppermint oil, clove oil, aniseed oil and the like. It is also possible to add artificial flavour.

Additional ingredients, such as colouring agents and medicinal components, as well as mouth conditioners, can also be added to the chewing gum.

Generally, the chewing gum according to the invention is manufactured by successively adding the various chewing gum ingredients to a suitable mixer. After the ingredients have been thoroughly mixed, the mixture is discharged from the mixer and brought into the desired form, for instance by rolling and slicing, extruding or pelleting. In general, the ingredients are first mixed by melting the gum base which is added to a rotating mixer. The base can also be melted in the mixer itself. Colouring agents are preferably added at this time. A plasticizer is then brought into the mixer together with the sweetener and a part of the filler. The optional further required components can be added next. After mixing has been completed, the chewing gum is taken from the mixer and brought into the desired form.

The invention will now be elucidated in and by the following examples.

EXAMPLE 1

An amorphous, non-crystallizable copolymer of 80 mol. % L-lactide and 20 mol. % D-lactide was prepared by ring-opening polymerisation in the melt, in the presence of 0.1% by weight tin octoate as catalyst. To this polymer was added an amount of 20% by weight of $\epsilon$-caprolactone, whereafter, under nitrogen and with continuous mechanical stirring, the mixture was heated to 150° C. To the homogeneous mixture, again 0.1% by weight tin octoate as catalyst was added, whereafter the polymerisation was completed.

The obtained polymer had a glass transition temperature (DSC, heating rate 10° C./min) of 15°. During chewing the polymeric material provided a chew feel strongly resembling that of conventional chewing gum. The degradation products of this copolymer are L-lactic acid, D-lactic acid and $\omega$-hydroxyhexanoic acid, all non-toxic and water-soluble compounds.

On the basis of this polymer, a chewing gum was prepared using conventional additions and methods.

EXAMPLE 2

On the basis of the copolymer of Example 1 as gum base, a number of types of chewing gum having the following compositions are prepared.

64% by weight sugars and sweeteners (sorbitol, xylitol and saccharine), 1% by weight aroma and 35% by weight gum base, and emulsifier.

40% by weight sugar, 2% by weight aroma and 58% by weight gum base, and emulsifier.

35% by weight sugar, 3% by weight aroma and 62% by weight gum base, and emulsifier.

EXAMPLE 3

An amorphous, non-crystallizable copolymer of 25 mol. % L-lactide, 25 mol. % D-lactide and 50 mol. % $\epsilon$-caprolactone was prepared by ring-opening polymerisation in the melt, in the presence of 0.1% by weight tin octoate as catalyst.

The obtained polymer has a glass transition temperature (DSC, heating rate 10° C./min) of −10° C.

To the polymer formed, under nitrogen, 40% by weight of sorbitol and an effective amount of emulsifier were added and mechanically mixed. During chewing the polymeric material provided a chew feel strongly resembling that of a conventional chewing gum.

EXAMPLE 4

Example 3 was repeated, except that instead of sorbitol 20% by weight of glycerol was added.

We claim:

1. A biodegradable chewing gum comprising one or more conventional chewing gum components and a gum base comprising at least one biodegradable polyester polymer obtained by the polymerization of one or more cyclic esters.

2. A biodegradable chewing gum in accordance with claim 1 wherein the polyester polymer has a glass transition temperature of at most 37° C., and chemically unstable bonds in the polymer chain.

3. A chewing gum according to claim 2, wherein said unstable bonds can be broken under the influence of light.

4. A chewing gum according to claim 2 wherein said unstable bonds can be broken hydrolytically.

5. A biodegradable chewing gum in accordance with claim 1 wherein said polyester polymer has a glass transition temperature of at most 37° C.

6. A chewing gum according to claim 5, wherein the polyester polymer is based on one or more cyclic esters selected from the group consisting of lactide, glycolide, trimethylene carbonate and $\epsilon$-caprolactone.

7. A chewing gum according to claim 6, wherein the polyester polymer is a copolymer of lactide and $\epsilon$-caprolactone.

8. A chewing gum according to claim 5, wherein the polyester polymer is a block copolymer of lactide and $\epsilon$-caprolactone, or a mixture of a polymer of lactide and a polymer of $\epsilon$-caprolactone.

9. A chewing gum according to claim 1 further comprising as additives one or more components selected from the group consisting of fillers, antioxidants, plasticizers, sweeteners, flavouring substances, colouring substances, medicinal components and mouth conditioners.

10. A chewing gum according to claim 1, wherein the gum base is present in an amount of 5 to 95% by weight, and wherein 5–95% by weight additives are present.

11. A chewing gum according to claim 1, wherein medicinal and/or mouth conditioning components are present.

* * * * *